(12) United States Patent
Richardson

(10) Patent No.: US 9,902,518 B1
(45) Date of Patent: Feb. 27, 2018

(54) COLLAPSIBLE REFUSE BAG SUPPORT STAND

(71) Applicant: Earnest Richardson, Dallas, TX (US)

(72) Inventor: Earnest Richardson, Dallas, TX (US)

( * ) Notice: Subject to any disclaimer, the term of this patent is extended or adjusted under 35 U.S.C. 154(b) by 0 days.

(21) Appl. No.: 15/600,683

(22) Filed: May 19, 2017

(51) Int. Cl.
   *B65B 67/04* (2006.01)
   *B65B 67/12* (2006.01)
   *B65F 1/14* (2006.01)

(52) U.S. Cl.
   CPC ...... *B65B 67/1205* (2013.01); *B65B 67/1233* (2013.01); *B65F 1/1415* (2013.01); *B65B 67/12* (2013.01); *B65B 67/1222* (2013.01); *B65F 1/14* (2013.01); *B65F 1/141* (2013.01); *B65F 2220/106* (2013.01)

(58) Field of Classification Search
   USPC .......................................................... 248/97
   See application file for complete search history.

(56) References Cited

U.S. PATENT DOCUMENTS

| | | | | |
|---|---|---|---|---|
| 666,045 | A * | 1/1901 | Beeson | B65F 1/1415 211/12 |
| 957,260 | A * | 5/1910 | Sackett | B65B 67/12 248/101 |
| 1,691,571 | A * | 11/1928 | Haven | B65B 67/1205 248/98 |
| 2,100,235 | A * | 11/1937 | Brown | B65B 67/1227 248/100 |
| 2,422,239 | A * | 6/1947 | Holt | B64D 37/06 220/560.02 |
| 3,410,328 | A * | 11/1968 | Sasai | B65D 7/26 108/145 |
| 3,603,541 | A | 9/1971 | Sturm et al. | |
| 3,806,146 | A * | 4/1974 | Shaw | B62B 3/106 248/129 |
| 3,905,406 | A * | 9/1975 | Cruse | B65B 67/1205 141/390 |
| 4,299,365 | A | 11/1981 | Battle | |
| 4,588,154 | A * | 5/1986 | Basore | B65B 67/1244 211/206 |
| 4,723,743 | A * | 2/1988 | Jenkins | B65B 67/12 220/486 |
| D299,575 | S | 1/1989 | DiFrank | |
| 4,840,336 | A * | 6/1989 | Stroh | B65B 67/1227 248/175 |

(Continued)

*Primary Examiner* — Monica Millner
(74) *Attorney, Agent, or Firm* — Stevenson IP, LLC

(57) ABSTRACT

A collapsible refuse bag support stand for holding upright a refuse bag, which is not attached to a push lawnmower, by including a hollow collapsible parallelepiped frame having parallelepiped upper and lower frame portions and a leg perpendicularly disposed thereto on an interior side of the frame there between. A hanger bar is disposed between the legs on the rear and front sides on the internal side. A pair of diametrically-disposed locking hinge bars is also provided for frame collapsibility. Bag clips are securable to each of the hanger bars to attach the refuse bag thereto. A pivot bolt is disposed through a frame exterior side at each corner of each of the upper and lower frame portions and an outer end of the respective hanger bar. A storage clip is engageable to an attachment pin when the parallelepiped frame is collapsed to secure the upper and lower frame portions together.

4 Claims, 5 Drawing Sheets

(56) References Cited

U.S. PATENT DOCUMENTS

| | | | | |
|---|---|---|---|---|
| 4,927,104 A * | 5/1990 | Miller | B65B 67/1205 | 248/150 |
| 4,934,636 A * | 6/1990 | Orlosky | B65B 67/12 | 211/194 |
| 5,183,226 A * | 2/1993 | Brooks | B65B 67/1205 | 248/97 |
| 5,570,862 A * | 11/1996 | Nugent | B65B 67/1205 | 248/101 |
| 5,639,050 A * | 6/1997 | Peterson | B65B 67/1205 | 220/495.08 |
| 5,738,314 A * | 4/1998 | Davis | B65B 67/1205 | 248/175 |
| 5,746,343 A * | 5/1998 | Waltke | B65D 19/12 | 206/600 |
| 5,775,649 A | 7/1998 | O'Leary | | |
| 5,897,012 A * | 4/1999 | Sortwell | B65D 19/12 | 206/600 |
| 6,116,549 A * | 9/2000 | Santa Cruz | B65B 67/12 | 248/97 |
| 6,199,802 B1 * | 3/2001 | Scheibe, Sr. | B65F 1/1415 | 248/101 |
| 6,213,315 B1 * | 4/2001 | Forney | B65B 69/0083 | 211/194 |
| 6,237,878 B1 * | 5/2001 | Nelson | B65B 67/1227 | 248/97 |
| 6,382,573 B1 * | 5/2002 | Cepeda | B65B 67/1205 | 248/150 |
| 6,446,919 B1 * | 9/2002 | Tsui | B65B 67/1205 | 248/100 |
| 6,676,092 B2 * | 1/2004 | Tsai | B65F 1/1415 | 248/149 |
| 7,066,389 B2 * | 6/2006 | Dickover | A47F 9/046 | 235/383 |
| 7,284,732 B1 * | 10/2007 | Lopa | B65B 67/1233 | 248/101 |
| 7,819,269 B2 * | 10/2010 | Perkins | B65D 19/18 | 220/1.6 |
| 9,033,291 B2 * | 5/2015 | Branham | B65B 67/1211 | 248/100 |
| 2004/0195467 A1 * | 10/2004 | Passage | B65B 67/1205 | 248/99 |

* cited by examiner

COLLAPSIBLE REFUSE BAG SUPPORT STAND

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of leaf and refuse bag holders are known in the prior art. However, what is needed, and what the present device provides is a collapsible refuse bag support stand which prevents spillage of leaves and other lawn refuse when filling the refuse bag. The bag support stand is configured to hold, in an upright position, a refuse bag not attached to a push lawnmower. The stand can be used in conjunction with a lawnmower bag, which can be emptied into the refuse bag from the top with no spilling of debris because both are square.

FIELD OF THE INVENTION

The present invention relates to leaf and refuse bag holders and, more particularly, to a collapsible refuse bag support stand.

SUMMARY OF THE INVENTION

The general purpose of the present collapsible refuse bag support stand, described subsequently in greater detail, is to provide a collapsible refuse bag support stand which has many novel features that result in a collapsible refuse bag support stand which is not anticipated, rendered obvious, suggested, or even implied by prior art, either alone or in combination thereof. To accomplish this, the present collapsible refuse bag support stand is devised to provide support for holding a refuse bag, which is not attached to a push lawnmower, in an upright position without spillage of the contents, such as leaves and other lawn refuse, of the bag. The instant device includes a hollow collapsible parallelepiped frame having a parallelepiped upper frame portion and a parallelepiped lower frame portion parallel thereto. A leg is vertically disposed on an interior side of the frame between and spanning the upper frame portion and the lower frame portion at each of the corners. A hanger bar is disposed between in a position parallel to and spanning the internal side of each leg on the rear side and the internal side of each leg on the front side. A pivot bolt is disposed through an exterior side of the frame at each of notched corners of each of the upper and lower frame portions, and the respective outer end of the respective hanger bar. A pair of diametrically disposed locking hinge bars is provided to promote collapsibility of the frame. A plurality of bag clips is securable to each of the locking hinge bars and is configured to attach an upper end of a refuse bag to each of the locking hinge bars. A cylindrical attachment pin is disposed on the exterior side of one of the right side and the left side proximal the upper frame portion. A storage clip is disposed on the exterior side of one of the right side and the left side proximal the lower frame portion in a position diametrically opposed to the attachment pin. The storage clip is engageable to the attachment pin when the parallelepiped frame is in a collapsed condition.

The collapsible refuse bag support stand can be produced in different sizes to accommodate the use of all sizes of refuse bags. The sizes can include, but not be limited to, a large, a medium, and a small. The measurements of each of the large, the medium, and the small vary only in length, but not height and width. It is envisioned that the height and width of each of the large, the medium, and the small are 17.5 inches wide and 34 inches high. It is envisioned that the length of each of the large, the medium, and the small is 31.5 inches, 27.5 inches, and 23.5 inches, respectively.

Thus has been broadly outlined the more important features of the present collapsible refuse bag support stand so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
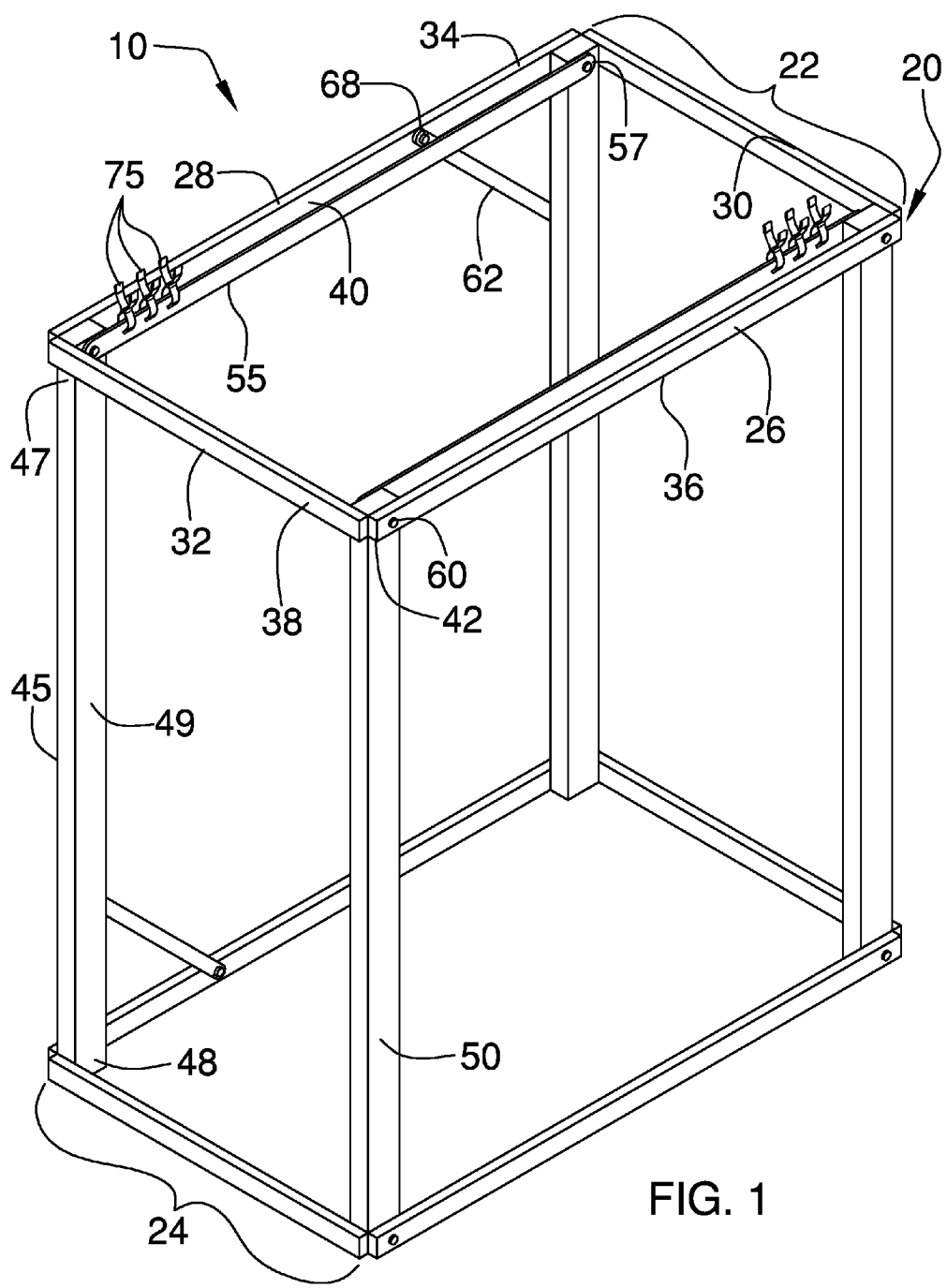
FIG. 1 is a front isometric view.
Figure 2:
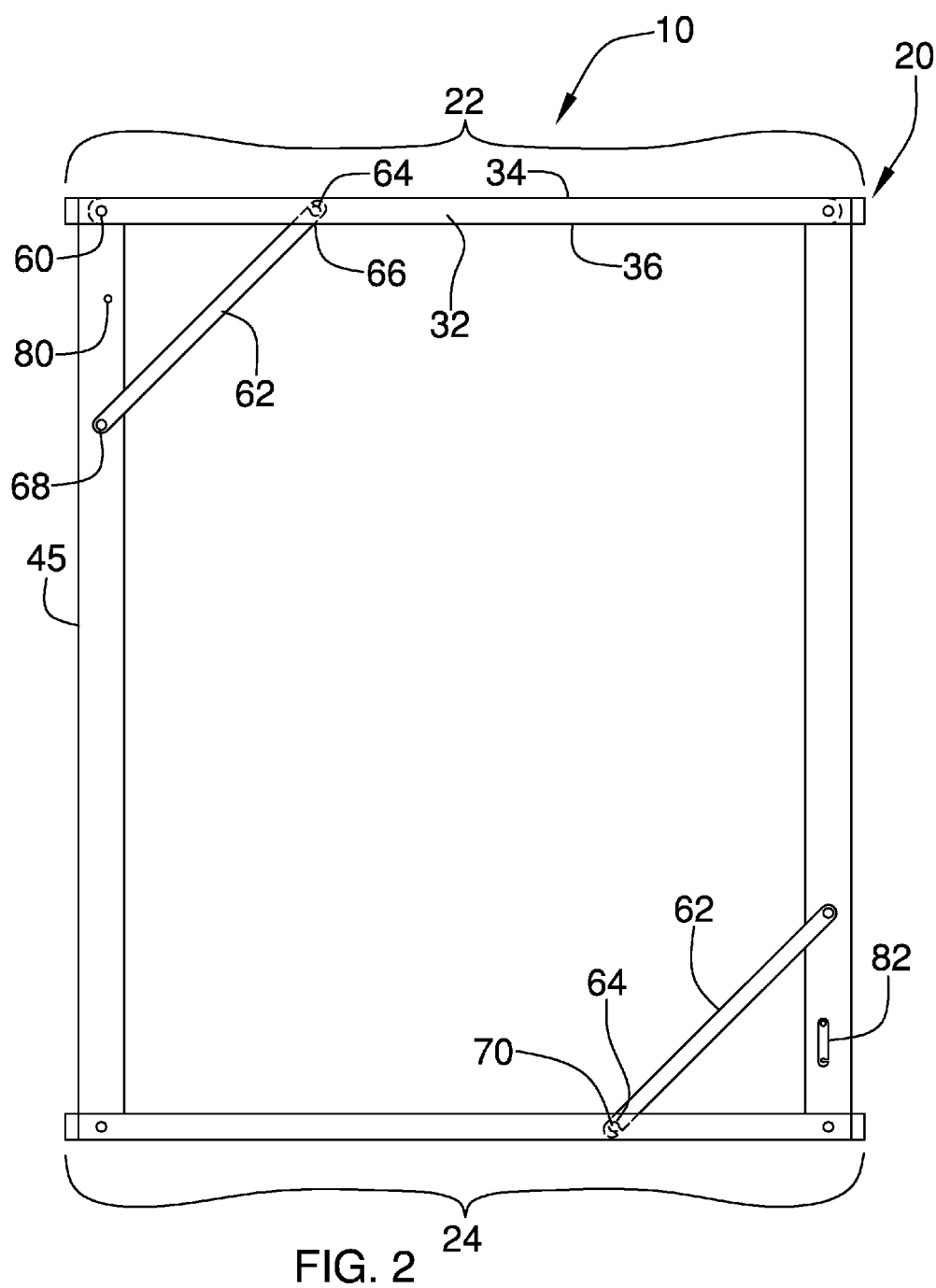
FIG. 2 is a rear elevation view.
Figure 3:
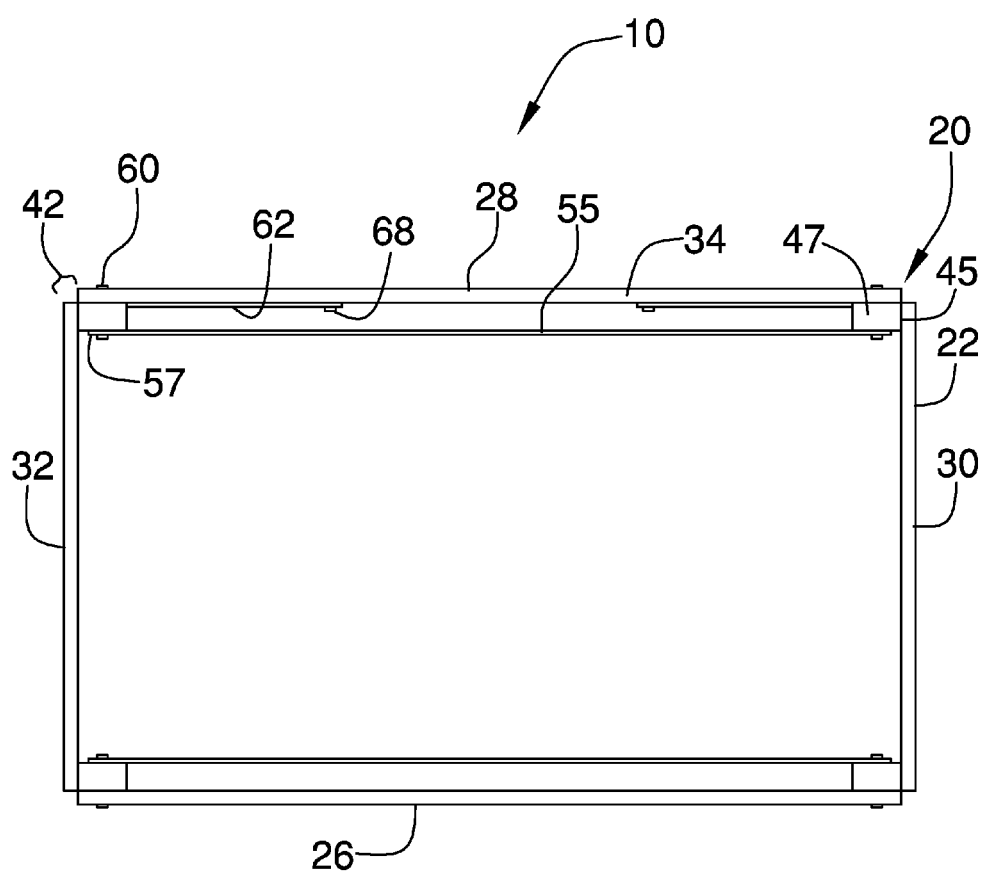
FIG. 3 is a top plan view.
Figure 4:
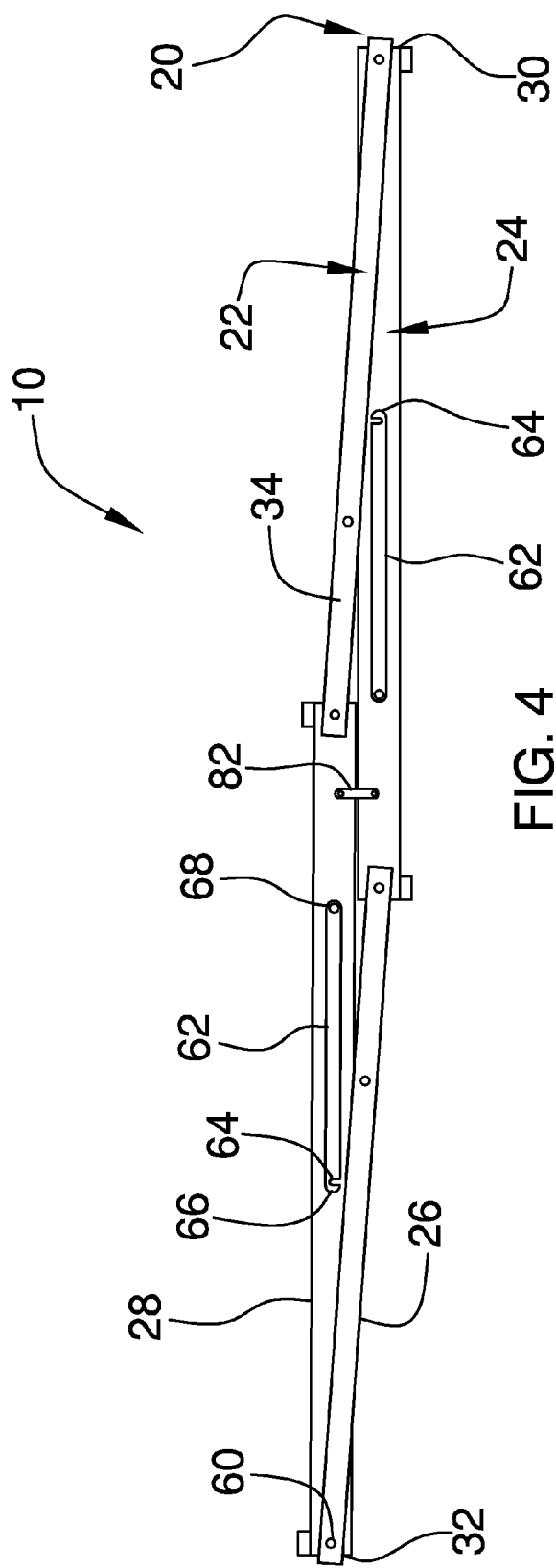
FIG. 4 is a side elevation view in a collapsed condition.
Figure 5:
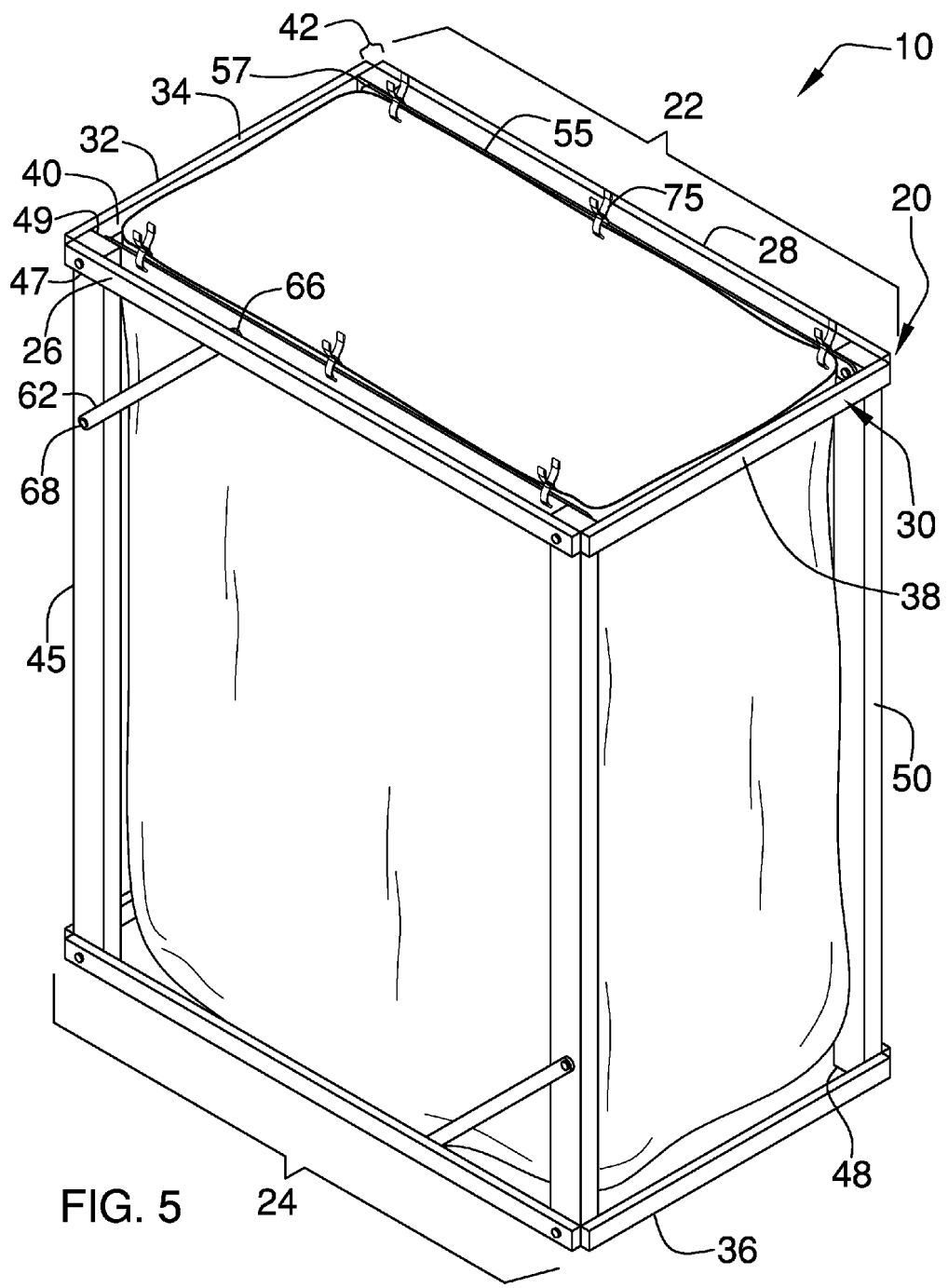
FIG. 5 is an in-use view.

With reference now to the drawings, and in particular FIGS. 1 through 5 thereof, an example of the instant collapsible refuse bag support stand employing the principles and concepts of the present collapsible refuse bag support stand and generally designated by the reference number 10 will be described.

Referring to FIGS. 1 through 5, the present collapsible refuse bag support stand 10 is illustrated. The collapsible refuse bag support stand 10 includes a hollow collapsible parallelepiped frame 20. The parallelepiped frame 20 has a parallelepiped upper frame portion 22 and a parallelepiped lower frame portion 24 parallel to the upper frame portion 22. Each of the upper frame portion 22 and the lower frame portion 24 has a front side 26, a rear side 28, a right side 30, a left side 32, a top side 34, a bottom side 36, an exterior side 38, an interior side 40, and a plurality of notched corners 42 on the exterior side 38. The notched corners 42 aid in the collapsibility of the device 10. The parallelepiped frame 20 has a width, length and height configured to hold a refuse bag typically attached to a push lawnmower in an upright position.

A leg 45 is vertically disposed on the interior side 40 between and spans the upper frame portion 22 and the lower frame portion 24 at each of the corners 42. Each leg 45 has an upper end 47, a lower end 48, an internal side 49, and an external side 50.

A hanger bar 55 is disposed between in a position parallel to and spanning the internal side 49 of each leg 45 on the rear side 28 and the internal side 49 of each leg 45 on the front side 26. Each hanger bar 55 has a pair of outer ends 57. A plurality of pivot bolts 60 is provided. One of the plurality of pivot bolts 60 is disposed through the exterior side 38 of each of the front side 26 and the rear side 28 at each of the corners 42 of each of the upper frame portion 22 and the lower frame portion 24, each of the upper end 47 and the lower end 48 of the respective leg 45, and the respective outer end 57 of the respective hanger bar 55.

A pair of diametrically disposed locking hinge bars 62 is provided. One of pair of locking hinge bars 62 is diagonally disposed between and connects each of the upper frame portion 22 and the lower frame portion 24 to the respective one of the left side 32 and the right side 30. Each of the pair of locking hinge bars 62 has a locking notch 64 on an external end 66 disposed on the respective one of the upper frame portion 22 and the lower frame portion 24. A pivot hinge 68 is disposed on the exterior side 38 of each of the upper frame portion 22 and the lower frame portion 24 and the respective left side 32 and right side 30. A pivot pin 70 is disposed on the respective upper frame portion 22 and the lower frame portion 24. The locking notch 64 on the external end 66 of each of the upper frame portion 22 and the lower frame portion 24 is engageable to the pivot pin 70 on the respective upper frame portion 22 and the lower frame portion 24.

A plurality of bag clips 75 is securable to each of the locking hinge bars 62. The bag clips 75 are configured to attach an upper end 47 of a refuse bag to each of the locking hinge bars 62.

A cylindrical attachment pin 80 is disposed on the exterior side 38 of one of the right side 30 and the left side 32 proximal the upper frame portion 22. A storage clip 82 is disposed on the exterior side 38 of one of the right side 30 and the left side 32 proximal the lower frame portion 24 in a position diametrically opposed to the attachment pin 80. The storage clip 82 is engageable to the attachment pin 80 when the parallelepiped frame 20 is in a collapsed condition to secure the upper and lower frame portions together.

What is claimed is:

1. A collapsible refuse bag support stand comprising:
   a hollow collapsible parallelepiped frame having:
      a parallelepiped upper frame portion;
      a parallelepiped lower frame portion parallel to the upper frame portion, each of the upper frame portion and the lower frame portion having a front side, a rear side, a right side, a left side, a top side, a bottom side, an exterior side, an interior side, and a plurality of notched corners on the exterior side;
      a leg vertically disposed on the interior side between and spanning the upper frame portion and the lower frame portion at each of the corners, each leg having an upper end, a lower end, an internal side and an external side;
      a hanger bar disposed between in a position parallel to and spanning the internal side of each leg on the rear side and the internal side of each leg on the front side, each hanger bar having a pair of outer ends;
      a plurality of pivot bolts, one of the plurality of pivot bolts disposed through the exterior side of each of the front side and the rear side at each of the corners of each of the upper frame portion and the lower frame portion, each of the upper end and the lower end of the respective leg, and the respective outer end of the respective hanger bar;
      a pair of diametrically disposed locking hinge bars, one of pair of locking hinge bars diagonally disposed between and connecting each of the upper frame portion and the lower frame portion to the respective one of the left side and the right side, each of the pair of locking hinge bars having a locking notch on an external end disposed on the respective one of the upper frame portion and the lower frame portion;
      a pivot hinge disposed on the exterior side of each of the upper frame portion and the lower frame portion and the respective left side and right side;
      a pivot pin disposed on the respective upper frame portion and the lower frame portion, wherein the locking notch on the external end of each of the upper frame portion and the lower frame portion is engageable to the pivot pin on the respective upper frame portion and the lower frame portion; and
      a plurality of bag clips securable to each of the hanger bars, wherein the bag clips are configured to attach an upper end of a refuse bag to each of the hanger bars.

2. The collapsible refuse bag support stand of claim 1
   a cylindrical attachment pin disposed on the exterior side of one of the right side and the left side proximal the upper frame portion; and
   a storage clip disposed on the exterior side of one of the right side and the left side proximal the lower frame portion in a position diametrically opposed to the attachment pin, the storage clip engageable to the attachment pin when the parallelepiped frame is in a collapsed condition.

3. The collapsible refuse bag support stand of claim 1 wherein the parallelepiped frame has a width, length and height configured to hold a refuse bag typically attached to a push lawnmower in an upright position.

4. The collapsible refuse bag support stand of claim 2 wherein the parallelepiped frame has a width, length and height configured to hold a refuse bag, which is not attached to a push lawnmower, in an upright position.

* * * * *